(12) United States Patent  
Ito et al.

(10) Patent No.: US 6,304,395 B1  
(45) Date of Patent: Oct. 16, 2001

(54) VIEWING OPTICAL INSTRUMENT HAVING ROOF PRISM AND A ROOF PRISM

(75) Inventors: Taku Ito, Tokyo; Masato Noguchi, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/264,000

(22) Filed: Mar. 8, 1999

(30) Foreign Application Priority Data

Sep. 3, 1998 (JP) .................................................. 10-056936

(51) Int. Cl.$^7$ ................................. G02B 5/04; G02B 1/10
(52) U.S. Cl. .......................... 359/836; 359/584; 359/835; 359/834
(58) Field of Search ..................................... 359/580, 584, 359/588, 831, 835, 836, 834, 498, 407, 431, 487

(56) References Cited

U.S. PATENT DOCUMENTS 5,583,428 * 12/1996 Meier ................................... 359/834
5,917,656 * 6/1999 Hayakawa et al. ................... 359/637
6,014,255 * 1/2000 Van Der Wal et al. ............. 359/487

OTHER PUBLICATIONS

"Zeiss Binoculars–World Renowned", booklet published by Carl Zeiss (Germany), 1993.

* cited by examiner

*Primary Examiner*—Audrey Chang
*Assistant Examiner*—Jennifer Winstedt
(74) *Attorney, Agent, or Firm*—Greenblum & Bernstein, P.L.C.

(57) ABSTRACT

A viewing optical instrument has a roof prism which is provided with a pair of reflection surfaces intersecting at a nominal face angle of 90°, wherein the pupil is split by an edge line of the reflection surfaces of the roof prism. The reflection surfaces are provided with a multiple-layer coating which does not absorb visible light. A change in the phase difference produced between light incident on one of reflection surfaces located on opposite sides of an edge line of the roof prism and emitted from the other reflection surface, and light incident on the right reflection surface and emitted from the left reflection surface is restricted to reduce wavefront aberrations to thereby improve the quality of an image to be viewed. A roof prism used in the optical instrument is also disclosed.

20 Claims, 11 Drawing Sheets

VIEWING OPTICAL INSTRUMENT HAVING ROOF PRISM AND A ROOF PRISM

BACKGROUND OF THE INVENTION

1. Field of the Invention

The present invention relates to a viewing optical instrument having a roof prism, which is adapted to invert an object image in the vertical and horizontal directions. The present invention also relates to a roof prism.

2. Description of the Related Art

In viewing optical instruments, such as a monocular or binocular telescope, those using a roof prism having a pair of reflection surfaces intersecting at a nominal face angle of 90 degrees can be made small since an object image formed by an objective optical system can be inverted in the vertical and horizontal directions by a single roof prism. However, since the pupil of the objective optical system is split by an edge line of the reflection surfaces, the face angle must be highly precise. If the face angle is not accurate, a viewable double image occurs.

As is well known, in the case where light is reflected by a reflection surface, a phase difference is produced between two orthogonal P-polarized and S-polarized light components of a light wave before and after the reflection takes place. The phase difference has no adverse influence on the image to be viewed in an optical system having a Porro prism or the like in which the pupil is not split. To the contrary, the image to be viewed can be deteriorated in an optical system having a roof prism or the like in which the pupil is split by the edge line, due to wavefront aberrations caused by a difference in the polarization state between the lights emitted from the pair of reflection surfaces. This is because a change in the polarization state due to a phase difference caused by the reflection surfaces of the roof prism differs between the light incident on one of the reflection surfaces (first reflection surface) and emitted from the other reflection surface (second reflection surface), and the light incident on the second reflection surface and emitted from the first reflection surface. The larger the phase difference produced by the reflection surfaces, the greater the difference in the polarization state caused thereby. If the difference in the polarization state becomes large, the wavefront aberrations can increase, and consequently, a double image occurs and is viewed, and the contrast is reduced to the same as a pair of reflection surfaces having an inaccurate face angle.

To reduce the phase difference caused by the reflection surfaces of the roof prism, it is known to coat the reflection surface with a metal layer such as an aluminum or silver layer. It has been confirmed that the metal layer can reduce the phase difference in question. However, it has been found that the metal coating layer cannot sufficiently reduce the phase difference, particularly in accordance with an increase in the machining precision of the roof prism. Namely, if the machining precision is not high enough, it cannot be determined whether the deterioration of the image to be viewed is caused by the face angle error or by the phase difference. Consequently, the quality of the image is evaluated based on a combination of the face angle error and the phase difference. However, if the machining precision is increased, significance is chiefly placed on the phase difference.

SUMMARY OF THE INVENTION

It is an object of the present invention to provide a viewing optical instrument using a roof prism which has a highly accurate face angle, wherein the change in the phase difference produced before and after reflection by light incident on each of the pair of the reflection surfaces (located on opposite sides of an edge line) of the roof prism is restricted to reduce wavefront aberrations to thereby improve the quality of an image to be viewed.

Another object of the present invention is to provide a roof prism to be used in the viewing optical instrument.

According to the present invention, there is provided a viewing optical instrument having a roof prism which is provided with a pair of reflection surfaces intersecting at a nominal face angle of 90°, so that a pupil is split by an edge line of the reflection surfaces of the roof prism, wherein the reflection surfaces are provided with a multiple-layer coating.

According to another aspect of the present invention, there is provided, a roof prism including a pair of reflection surfaces intersecting at a nominal face angle of 90°, and the reflection surfaces being provided with a multiple-layer coating.

With the multiple-layer coating, the change in the phase difference between the P-polarized light component and the S-polarized light component, produced before and after the light is incident on the reflection surfaces of the roof prism, can be restricted within an allowable limit to thereby prevent an image to be viewed from being deteriorated.

Preferably, in the viewing optical system (or the roof prism) according to the present invention, the following condition (1) is satisfied: (1) $D \times E \times \epsilon \leq 60$ (mm·seconds); wherein, D designates the diameter (mm) of light flux in section, perpendicular to the direction of incidence thereof, incident on the reflection surfaces, and $\epsilon$ designates manufacturing error (seconds) of the face angle of the pair of the reflection surfaces which deviate from the nominal angle of 90°.

Condition (1) was obtained through experimentation, and if condition (1) is not satisfied, even if a multiple-layer coating is provided, image quality is decreased and the effect of a reduction in the amount of change in the phase difference before and after reflection cannot be confirmed.

Preferably, the precision of the nominal face angle of the roof prism is in the range of 90°±10".

In an optical system (or the roof prism) in which the machining precision of the nominal face angle of the roof prism is not within 90°±10", it cannot be confirmed whether the amount of change in the phase difference before and after reflection is reduced by the presence of the dielectric layers since the image is considerably deteriorated when the dimensional precision of the nominal face angle is not good.

Preferably, in the viewing optical instrument, there is provided at least one lens positioned in front of the roof prism. In this optical instrument, the multiple-layer coating preferably has optical properties wherein the change in the phase difference of the P-polarized component and the S-polarized component produced before and after reflection by light incident on each of the pair of the reflection surfaces of the roof prism, at an angle of incidence of ±1° with respect to the optical axis of the at least one lens, is within 90°. According to the inventor's analysis, if the difference (change) in the phase differences before and after the reflection is within 90°, no unacceptable image deterioration occurs. More preferably, the multiple-layer coating has optical properties to restrict the change in the phase differences before and after the reflection to within 20°.

In the aspect of the present invention which relates to a roof prism, the change in the phase difference of the P-polarized component and the S-polarized component produced before and after reflection by light incident on each of the pair of the reflection surfaces of the roof prism, at an incident angle of 47.74 to 49.74°, is within 90°.

The multiple-layer coating can include dielectric layers which do not absorb visible light (approximately 400 nm to 700 nm). Numerous multiple-layer coatings (dielectric layers) which do not absorb visible light are known.

More specifically, when the refractive index n of the Pechan prism (roof-prism) is 1.46<n<1.60, the multiple-layer coating can be composed of first to ninth dielectric layers superimposed on the reflection surfaces of the Pechan prism (roof-prism) in that order, the first to ninth dielectric layers having the following optical thicknesses d1 to d9 (nm) and refractive indexes M1, M2, M3, respectively, wherein 2.00<M1<2.10, 1.35<M2<1.40, 1.45<M3<1.50:

1st layer: 34.0<d1<42.5 (M1)

2nd layer: 86.5<d2<102.0 (M2)

3rd layer: 58.0<d3<67.5 (M1)

4th layer: 152.0<d4<162.5 (M3)

5th layer: 64.0<d5<70.0 (M1)

6th layer: 100.0<d6<109.0 (M3)

7th layer: 130.9<d7<136.5 (M1)

8th layer: 223.0<d8<232.0 (M2)

9th layer: 116.5<d9<121.5 (M1).

If the refractive index n of the material, of which the roof prism is made, is not within the range of 1.46<n<1.60, even if the multiple-layer coating (dielectric layers) are constructed as above, the intended (small) phase difference cannot be obtained. Various materials for the dielectric layers are known. For example, the material having the refractive index M1 can be selected from $Ta_2O_5$, $ZrO_2$, $NbO_5$, and $HfO_2$. $SiO_2$ can be used for the material having the refractive index M2. The material having the refractive index M3 can be selected from $MgF_2$, $CaF_2$, $Na_3AlF_1$, and NaF. The refractive indexes of these materials vary depending on the lamination conditions of the dielectric layers.

The present disclosure relates to subject matter contained in Japanese Patent Application No. 10-56936 (filed on Mar. 9, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
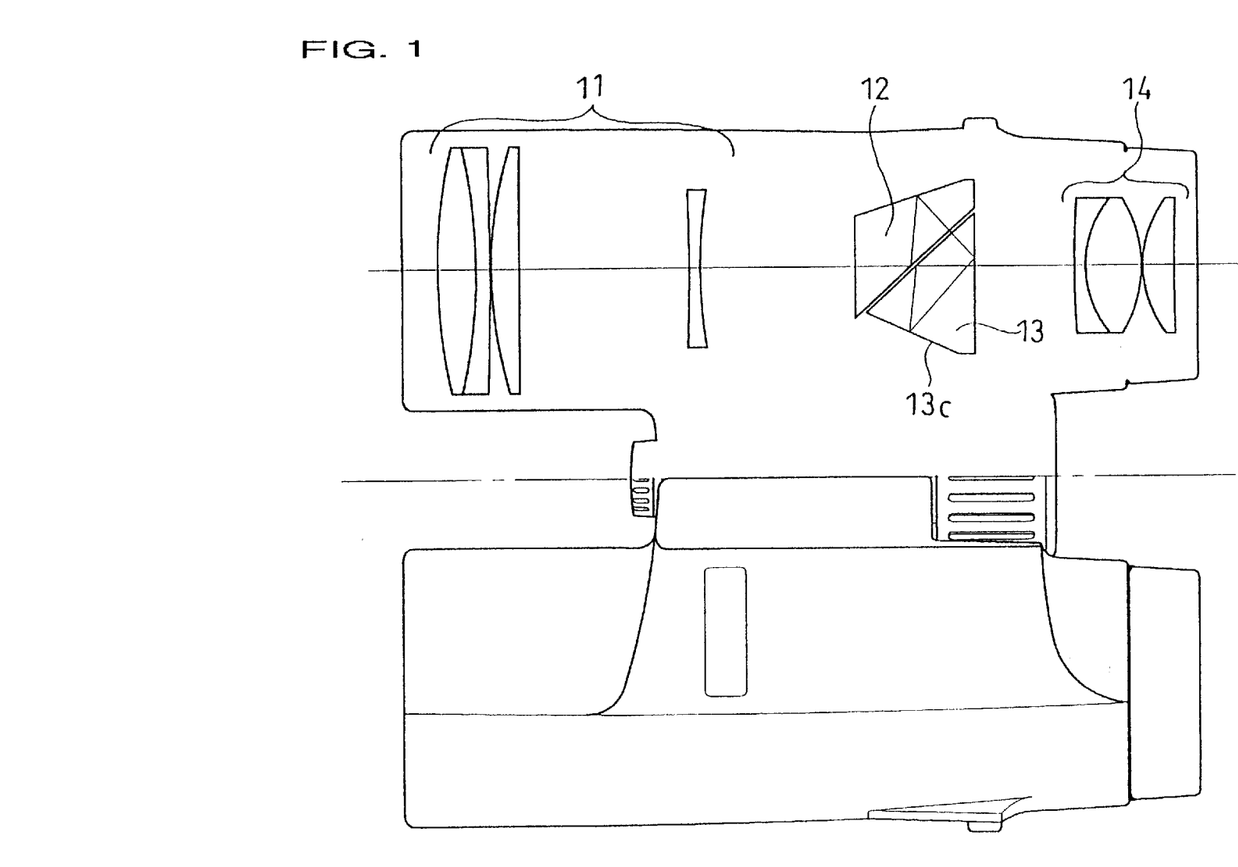
FIG. 1 is a plan view of a binocular telescope as a viewing optical instrument according to the present invention.
Figure 2:
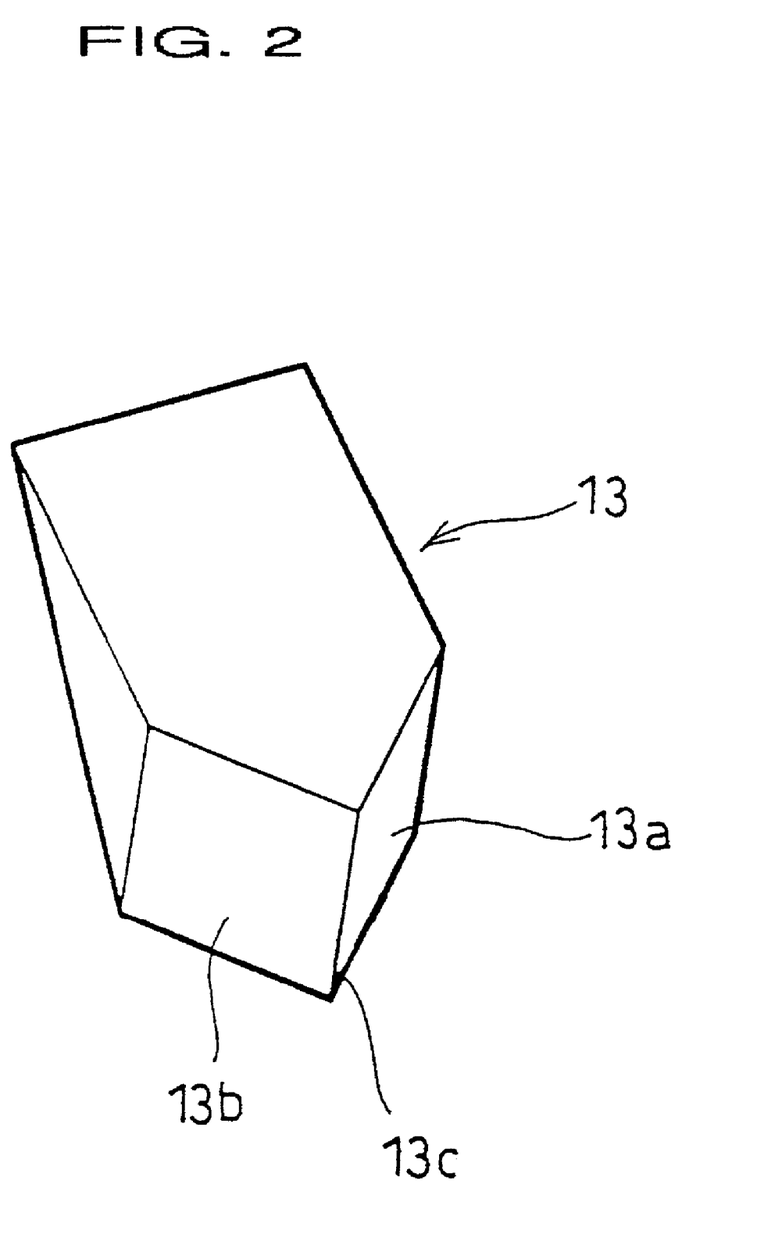
FIG. 2 is a perspective view of a roof prism of the binocular telescope shown in FIG. 1.
Figure 3:
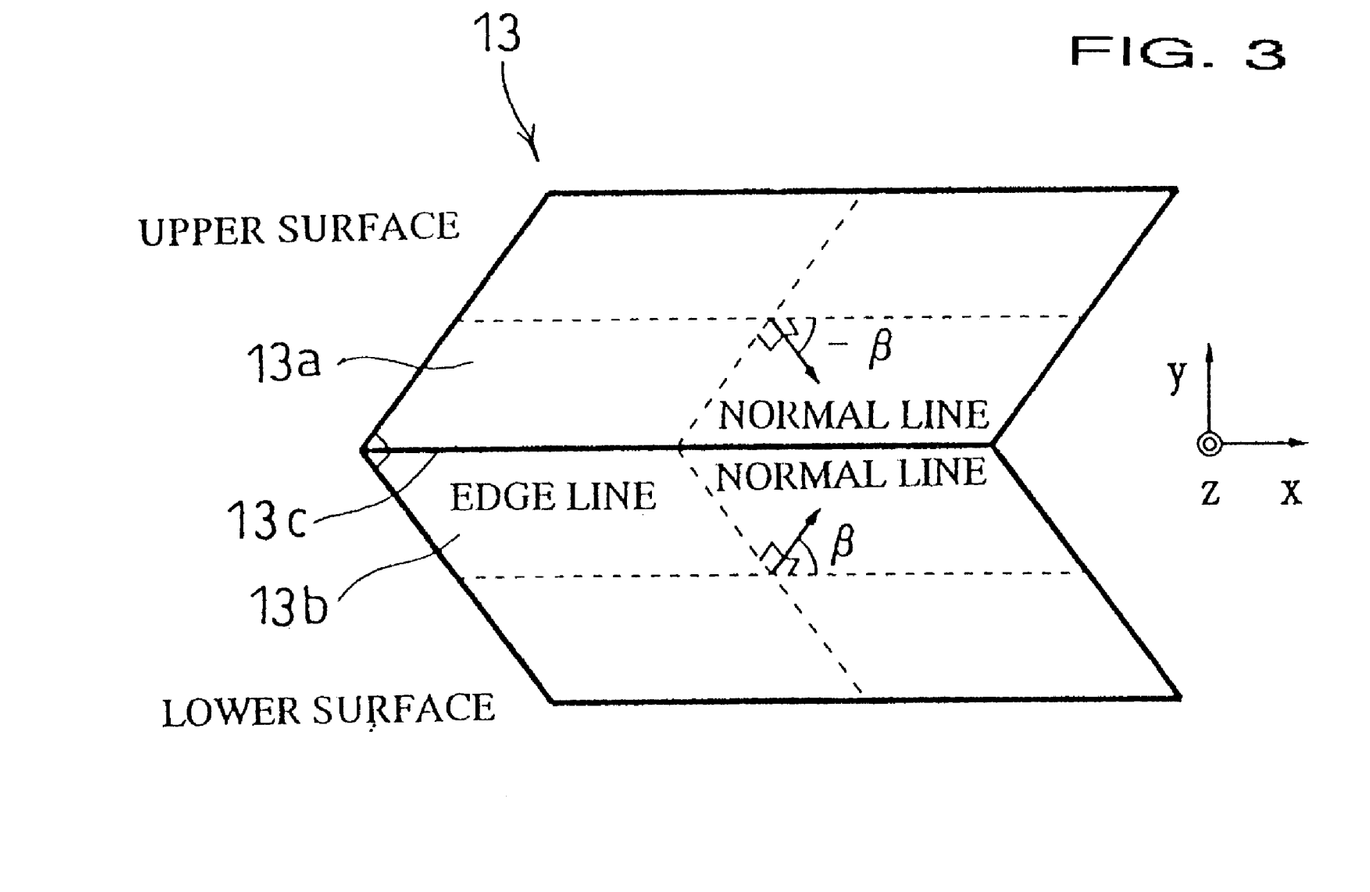
FIG. 3 is a schematic view of a roof prism in which a pupil is split by an edge line thereof.

In FIG. 1 which shows a binocular telescope using a roof prism, a pair of identical right and left optical systems are each composed of an objective lens group 11, an auxiliary prism 12, a roof prism (Pechan prism) 13, and an eyepiece lens group 14, arranged in this order from the object side. FIG. 2 shows a shape of the roof prism 13 by way of example. The roof prism 13 is provided with a pair of reflection surfaces (total reflection surfaces) 13a and 13b which intersect at a nominal face angle of 90°. In this optical system, an edge line 13c defined between the reflection surfaces 13a and 13b splits light emitted from a pupil of the objective lens group 11. Namely, light which is emitted from one point on an object to be viewed and is diverged through the objective lens group 11 is made incident on the reflection surfaces 13a and 13b on opposite sides of the edge line 13c, as can be seen in FIG. 3. Consequently, the image is inverted in the vertical and horizontal directions. The face angle (edge angle) defined between the reflection surfaces 13a and 13b is in the range of 90°±10" and preferably in the range of 90°±7".

Figure 16:
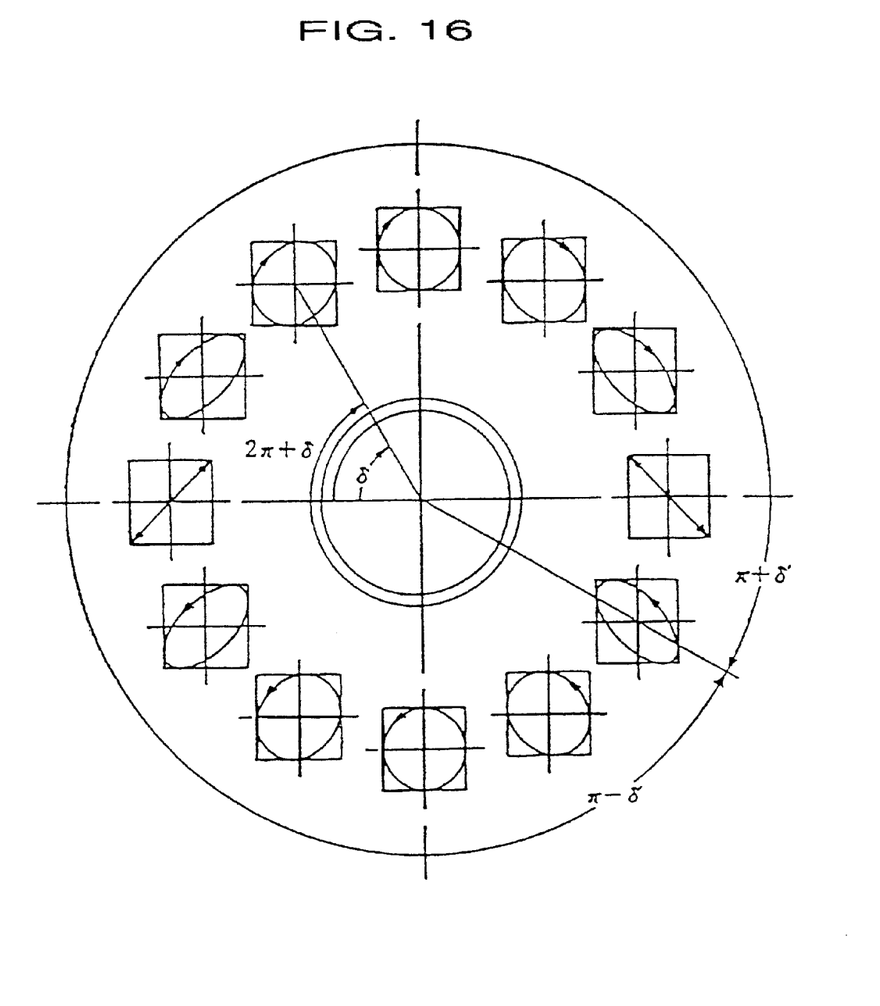

FIG. 16 shows a phase difference in the oscillation components of the light waves in orthogonal directions. If the amplitudes of P-polarized and S-polarized light components in the two orthogonal directions are identical, the polarization state changes due to the phase difference between the P-polarized and S-polarized light components and the phase lead and lag thereof, as shown in FIG. 16. As is well known, linearly polarized light is obtained when there is no phase difference between the P-polarized light component and the S-polarized light component; circularly polarized light is obtained when the phase difference is 90°; and elliptically polarized light which is intermediate light between the linearly polarized light and the circularly polarized light is obtained when the phase difference is between 0° and 90°. It should be recalled here that the phase difference itself, between the P-polarized light and the S-polarized light caused upon reflection of the light is not important. The problem with an optical system in which an edge line 13c defined between the reflection surfaces 13a and 13b splits light emitted from a pupil of the objective lens group 11, is that if the change in the phase difference of the P-polarized component and the S-polarized component produced before and after reflection by light incident on reflection surfaces 13a and 13b is large, a large polarization state change of the light flux emerging from both reflection surfaces 13a and 13b is produced. As a result, the wavefront aberrations increase, the contrast is reduced, and the probability of a viewable double image occurring is greatly increased.

The change in the polarization state will be discussed below with reference to the following formulae. In FIG. 3, assuming that the azimuth of the upper reflection surface 13a is $-\beta$, the azimuth of the lower reflection surface 13b is $\beta$, and the phase difference given to the light incident at an incident angle $\alpha$ by the reflection surfaces 13a and 13b, respectively, is $\Delta$; the Jones matrix Mu for the light which is incident on and emitted from the lower reflection surface 13b is given by equation (1) below:

$$Mu = M(-\beta, \Delta)M(\beta, \Delta) = \begin{pmatrix} a+bi & c \\ -c & a-bi \end{pmatrix} \quad (1)$$

($a$, $b$ and $c$ are real numbers)

The Jones matrix Me for the light incident on the upper reflection surface 13a and emitted from the lower reflection surface 13b is given by equation (2) below:

$$Me = M(\beta, \Delta)M(-\beta, \Delta) = \begin{pmatrix} a+bi & -c \\ c & a-bi \end{pmatrix} \quad (2)$$

($a$, $b$ and $c$ are real numbers)

On the assumption that the polarization state of the light incident on the roof prism 13 is $L_i$, the polarization state of the light emitted from the upper reflection surface is $L_{ou}$, and the polarization state of the light emitted from the lower reflection surface is $L_{oe}$, respectively, the following equation (3) is given:

$$Li = \begin{pmatrix} X \\ Y \end{pmatrix} \quad (3)$$

$$Lou = MuLi = \begin{pmatrix} a+bi & c \\ -c & a-bi \end{pmatrix}\begin{pmatrix} X \\ Y \end{pmatrix} = \begin{bmatrix} (a+bi)X + cY \\ (a-bi)Y - cX \end{bmatrix}$$

$$Loe = MeLi = \begin{pmatrix} a+bi & -c \\ c & a-bi \end{pmatrix}\begin{pmatrix} X \\ Y \end{pmatrix} = \begin{bmatrix} (a+bi)X - cY \\ (a-bi)Y + cX \end{bmatrix}$$

Figure 4:
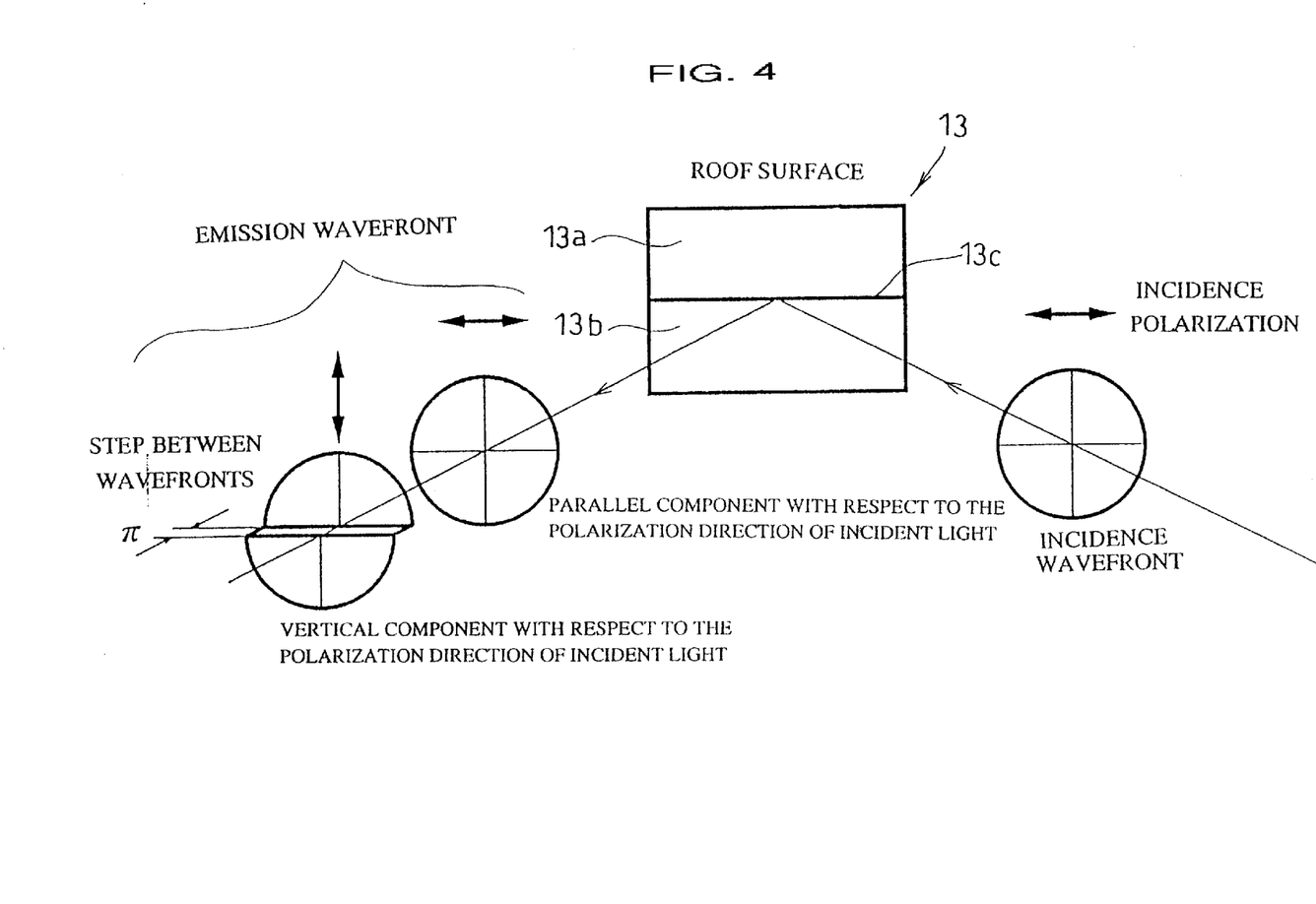
FIG. 4 is an explanatory view of a phase difference produced before and after incident light, which is linearly-polarized light component, is reflected.

As can be understood from the above expressions, the parallel light component which is emitted with the same polarization direction as that upon incidence is subject to the same predetermined function (i.e., there is no change in "a+bi" and "a−bi"); however, the vertical light component which is emitted in a polarization direction perpendicular to the polarization direction upon incidence has a different sign (i.e., "−c" and "c"). This means that the polarization state is different between the upper and lower portions of the pupil. For instance, if the incident light is linearly polarized x-direction light, X=1 and Y=0, and hence we have the following equation (4) from the expression (3). This is shown in FIG. 4.

$$Lou = MuLi = \begin{pmatrix} a+bi \\ -c \end{pmatrix} \quad (4)$$

$$Loe = MuLi = \begin{pmatrix} a+bi \\ c \end{pmatrix}$$

To minimize the polarization state in the upper and lower portions of the pupil, the value of "c" should be as close to 0 as possible.

$$c = -\sin^2(\Delta/2)\sin^4\beta$$

$$\therefore \sin^2(\Delta/2) = 0$$

To this end, $\Delta$ should be decreased, i.e., the phase difference caused by the reflection surfaces should be decreased.

Figure 5:
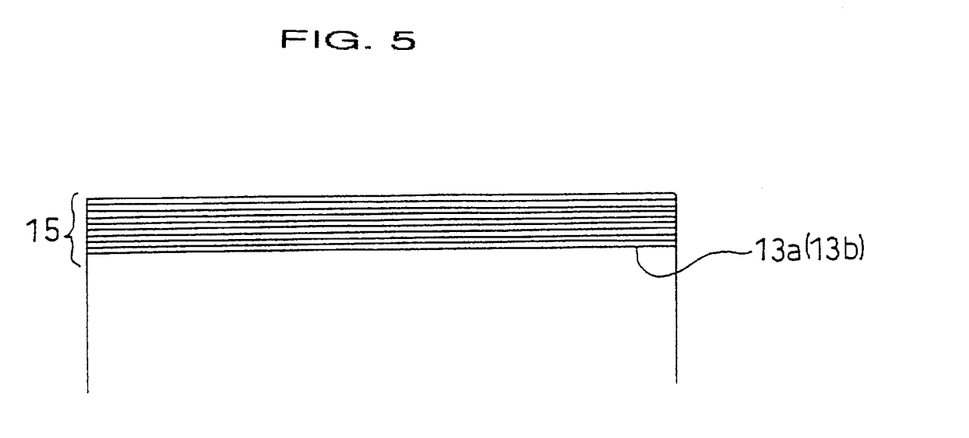
FIG. 5 is an explanatory view of a multi-layered dielectric layer formed on a reflection surface of a roof prism.

The reflection surfaces 13a and 13b are each provided with dielectric layers 15 as a multiple-layer coating, as shown in FIG. 5. The multiple-layer coating (dielectric layers) 15 is formed so that no visible light (whose wavelength is approximately in the range of 400 nm to 700 nm) is absorbed, i.e., the reflectance is 100%. More specifically, lets us consider light flux which is incident on the reflection surfaces 13a and 13b of the roof prism 13 through the objective lens 11 at an angle of incidence of ±1° with respect to the optical axis of the objective lens 11 (light which is incident on the reflection surfaces 13a and 13b of the roof prism 13 at an incident angle of 47.74° to 49.74°). The light flux which is incident on and reflected by the reflection surface 13a and subsequently is incident on the reflection surface 13b, and the light flux which is incident on and reflected by the reflection surface 13b is incident on and reflected by the reflection surface 13a both produce a change in phase difference between the P-polarized light component and the S-polarized light component before and after reflection. However, the dielectric layer 15 is formed so that the change in phase difference produced for each light flux is restricted to be within 90°. It has been discovered that if the change in phase difference is within 90°, no deterioration of an image to be viewed occurs, i.e., the image is not dimmed. The dielectric layer which exhibits the optical property as mentioned above can be optionally designed.

Several embodiments of the invention will be discussed below.

EMBODIMENT 1

The dielectric layer 15 shown in FIG. 5 is composed of 9 layers superimposed on the roof prism 13. Table 1 below shows numerical data of the first embodiment. When the extinction coefficient K is 0 (K=0), no absorption of light occurs.

TABLE 1

| Material | Refractive Index (n) | Layer Thickness (d) | Extinction Coefficient (k) |
| --- | --- | --- | --- |
| 1st layer: $Ta_2O_5$ | 2.0550 | 41.45 | 0 |
| 2nd layer: $MgF_2$ | 1.3880 | 88.52 | 0 |
| 3rd layer: $Ta_2O_5$ | 2.0550 | 66.23 | 0 |
| 4th layer: $SiO_2$ | 1.4693 | 155.14 | 0 |
| 5th layer: $Ta_2O_5$ | 2.0550 | 65.45 | 0 |
| 6th layer: $SiO_2$ | 1.4693 | 106.92 | 0 |
| 7th layer: $Ta_2O_5$ | 2.0550 | 133.60 | 0 |
| 8th layer: $MgF_2$ | 1.3880 | 227.69 | 0 |
| 9th layer: $Ta_2O_5$ | 2.0550 | 119.03 | 0 |

Monitor wavelength;550 nm

Refractive index of roof prism: 1.5181 (Material Type: BK7)

Accuracy of roof prism face angle: 90°±5" ($\epsilon$=5")

Diameter D(mm) of light flux in section, perpendicular to the direction of incidence thereof, incident on the total reflection surfaces: 6 mm $D \times \epsilon = 30$ (mm·seconds)

Figure 6:
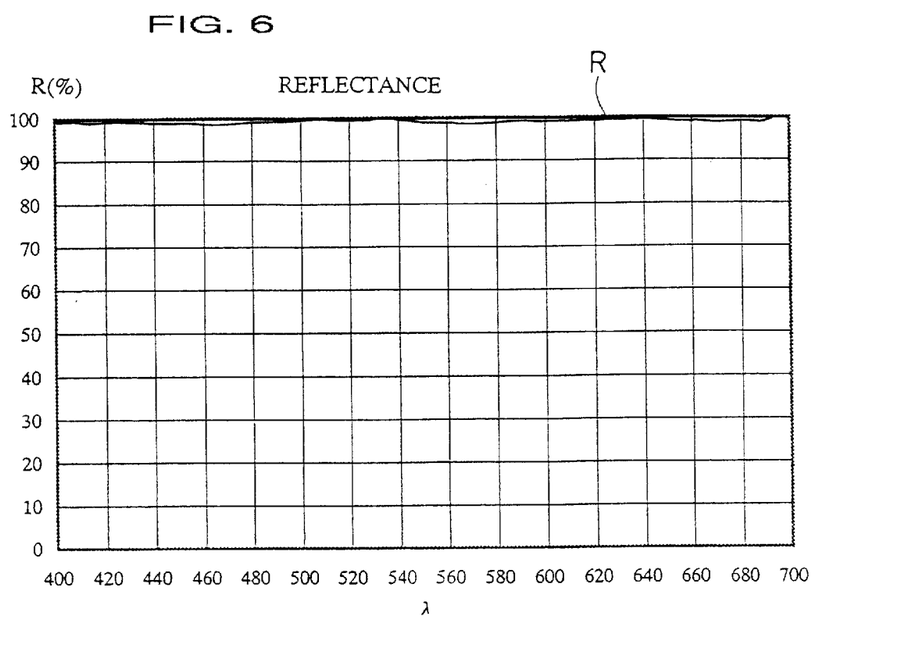
FIG. 6 is a graph which shows a reflectance R of each wavelength at an incident angle of 47.74° with respect to a pair of reflection surfaces when a dielectric layer according to a first embodiment is provided on a reflection surface of a roof prism.
Figure 7:
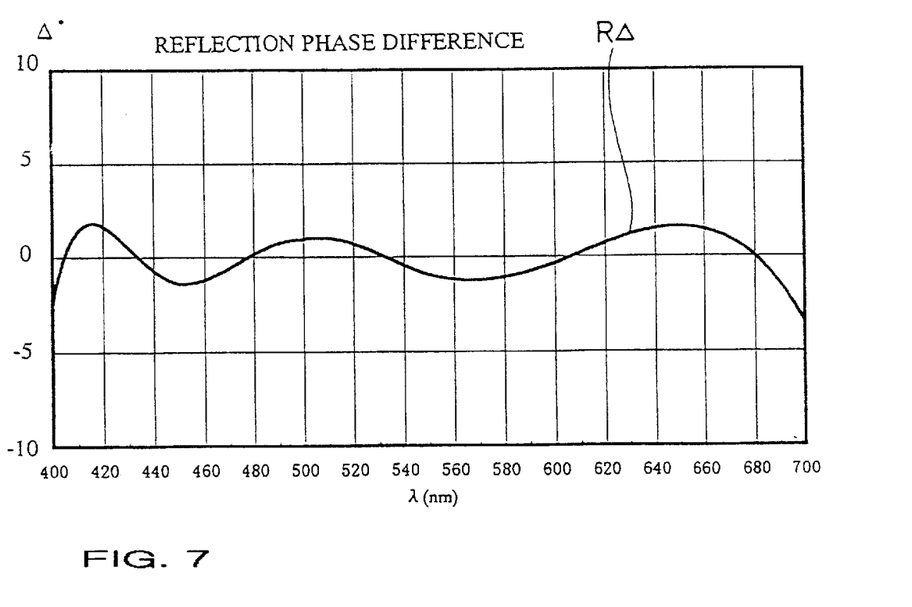
FIG. 7 is a graph which shows a change in phase difference RΔ at each wavelength, produced before and after light is reflected by each reflection surface when the incident angle is 47.74° with respect to a pair of reflection surfaces, in a first embodiment of the present invention.

FIG. 6 shows a reflectance R of each wavelength when the light flux which is incident on the reflection surface of the roof-prism 13 through the objective lens 11 at an angle of incidence of −1° with respect to the optical axis of the lens 11 (at an incident angle of 47.74° on the reflection surface) in the first embodiment. The reflectance of 100% is obtained in the entire wavelength range (400 to 700 nm) of the visible light. FIG. 7 shows the change in the phase differences for the same incident angle (47.74°) before and after the light is reflected by the reflection surfaces 13a and 13b. As made clear by the graph of FIG. 7, the amount of change in phase difference R Δ is reduced within ±3°.

Figure 8:
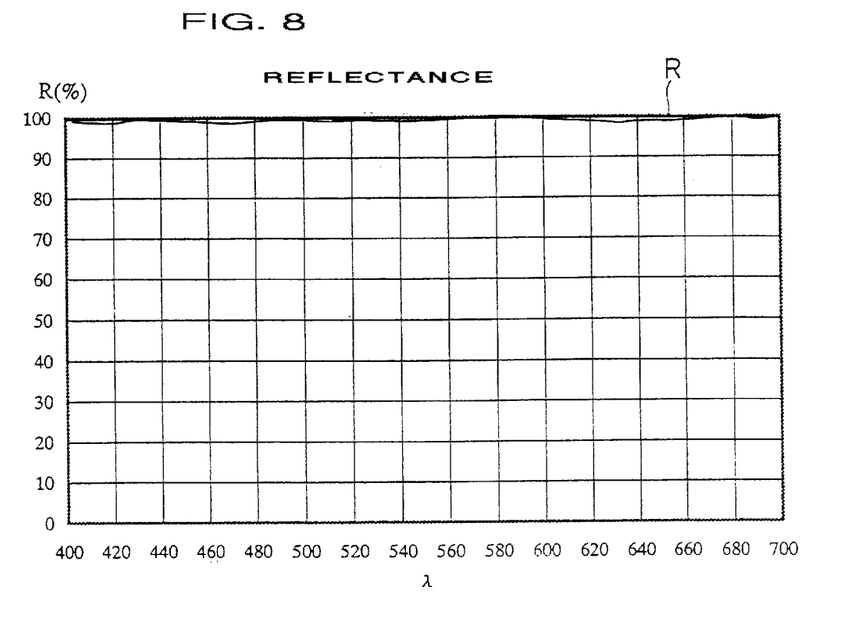
FIG. 8 is a graph which shows a reflectance R of each wavelength at an incident angle of 49.74° with respect to a pair of reflection surfaces, in a first embodiment of the present invention.
Figure 9:
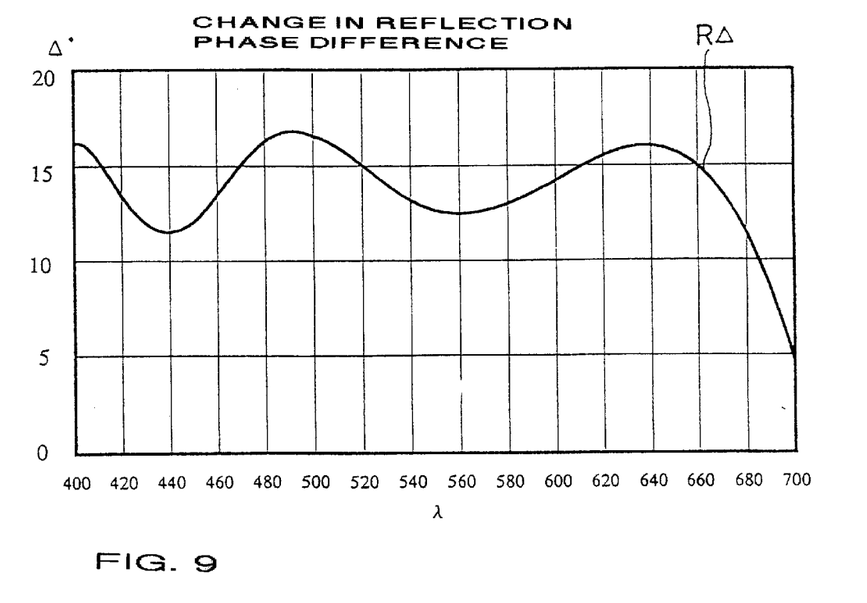
FIG. 9 is a graph which shows a change in phase difference RΔ at each wavelength, produced before and after light is reflected by each reflection surface when the incident angle is 49.74° with respect to a pair of reflection surfaces, in a first embodiment of the present invention.

FIG. 8 shows a reflectance R of each wavelength when the light flux which is incident on the reflection surface of the roof-prism 13 through the objective lens 11 at an angle of incidence of +1° with respect to the optical axis of the lens 11 (at an incident angle of 49.74° on the roof-prism) in the first embodiment. FIG. 9 shows the change in the phase differences for the same incident angle (49.74°) before and after the light is reflected by the reflection surfaces 13a and 13b. As made clear by the graphs of FIGS. 8 and 9 the reflectance is 100% and the amount of change in phase difference RΔ is approximately ±8°.

EMBODIMENT 2

The dielectric layer 15 shown in FIG. 5 is comprised of 9 layers superimposed on the roof prism 13. Table 2 shows the numerical data for the second embodiment thereof.

TABLE 2

| Material | Refractive Index (n) | Layer Thickness (d) | Extinction Coefficient (k) |
| --- | --- | --- | --- |
| 1st layer: $Ta_2O_5$ | 2.0550 | 36.43 | 0 |
| 2nd layer: $MgF_2$ | 1.3880 | 99.54 | 0 |
| 3rd layer: $Ta_2O_5$ | 2.0550 | 59.75 | 0 |
| 4th layer: $SiO_2$ | 1.4693 | 160.01 | 0 |
| 5th layer: $Ta_2O_5$ | 2.0550 | 67.92 | 0 |
| 6th layer: $SiO_2$ | 1.4693 | 102.85 | 0 |
| 7th layer: $Ta_2O_5$ | 2.0550 | 132.38 | 0 |
| 8th layer: $MgF_2$ | 1.3880 | 230.09 | 0 |
| 9th layer: $Ta_2O_5$ | 2.0550 | 120.09 | 0 |

Monitor wavelength;550 nm

Refractive index of roof prism;1.489 (Material Type: BK5)

Accuracy of roof prism face angle;90°±5" ($\epsilon$=5")

Diameter D(mm) of light flux in section, perpendicular to the direction of incidence thereof, incident on the total reflection surfaces: 6 mm $D \times \epsilon = 30$ (mm·seconds)

Figure 10:
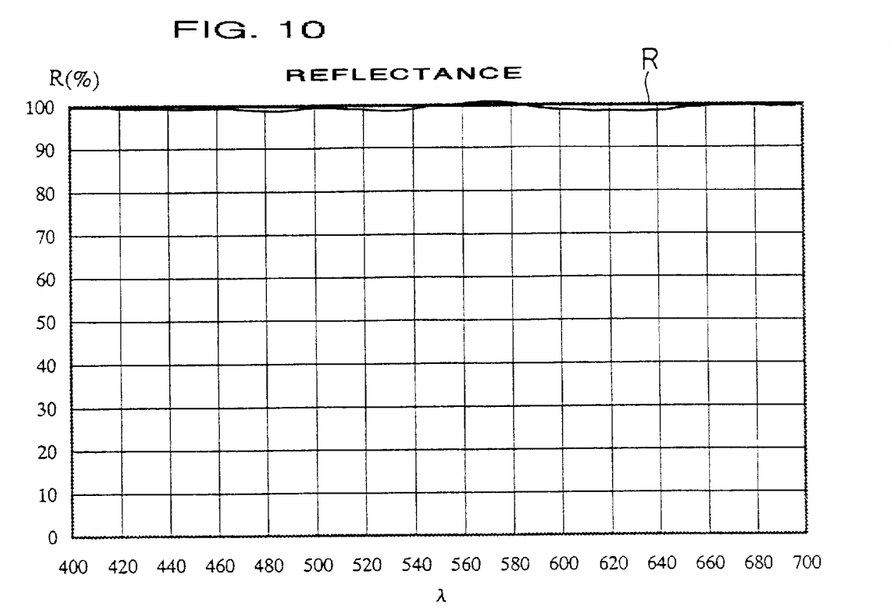
FIG. 10 is a graph which shows a reflectance R of each wavelength at an incident angle of 49.21° with respect to a pair of reflection surfaces, when a dielectric layer according to a second embodiment is provided on a reflection surface of a roof prism.
Figure 11:
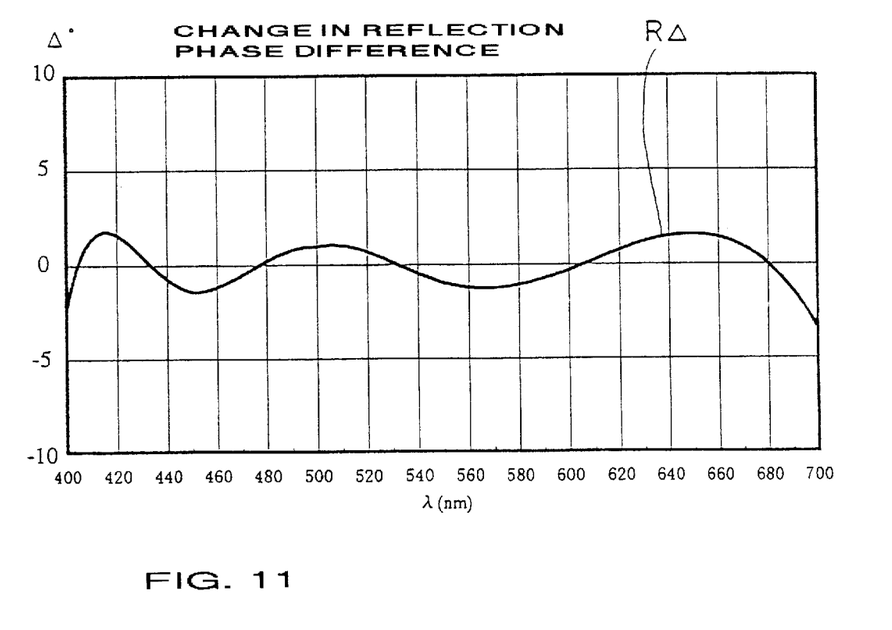
FIG. 11 is a graph which shows a change in phase difference RΔ at each wavelength, produced before and after light is reflected by each reflection surface when the incident angle is 49.21° with respect to a pair of reflection surfaces, in a second embodiment of the present invention.

FIG. 10 shows a reflectance R of each wavelength when the light flux which is incident on the reflection surface of the roof-prism 13 through the objective lens 11 at an angle of incidence of +0.47° with respect to the optical axis of the lens 11 (at an incident angle of 49.21° on the roof-prism) in the second embodiment. The reflectance of 100% is obtained in the entire wavelength range (400 to 700 nm) of the visible light. FIG. 11 shows the change in the phase differences for the same incident angle (49.21°) before and after the light is reflected by the reflection surfaces 13a and 13b. As made clear by the graph of FIG. 11, the amount of change in phase difference RΔ is reduced to be within approximately ±3°.

EMBODIMENT 3

The dielectric layer 15 shown in FIG. 5 is comprised of 9 layers superimposed on the roof prism 13. Table 3 shows numerical data thereof.

TABLE 3

| Material | Refractive Index (n) | Layer Thickness (d) | Extinction Coefficient (k) |
| --- | --- | --- | --- |
| 1st layer: $Ta_2O_5$ | 2.0550 | 39.42 | 0 |
| 2nd layer: $MgF_2$ | 1.3880 | 93.42 | 0 |
| 3rd layer: $Ta_2O_5$ | 2.0550 | 64.19 | 0 |
| 4th layer: $SiO_2$ | 1.4693 | 156.50 | 0 |
| 5th layer: $Ta_2O_5$ | 2.0550 | 65.83 | 0 |
| 6th layer: $SiO_2$ | 1.4693 | 106.68 | 0 |
| 7th layer: $Ta_2O_5$ | 2.0550 | 133.36 | 0 |
| 8th layer: $MgF_2$ | 1.3880 | 228.08 | 0 |
| 9th layer: $Ta_2O_5$ | 2.0550 | 119.10 | 0 |

Monitor wavelength: 550 nm

Refractive index of roof prism: 1.499 (Material Type: BK7)

Accuracy of roof prism face angle: 90°±5" ($\epsilon$=5")

Diameter D(mm) of light flux in section, perpendicular to the direction of incidence thereof, incident on the total reflection surfaces: 6 mm $D \times \epsilon = 30$ (mm·seconds)

Figure 12:
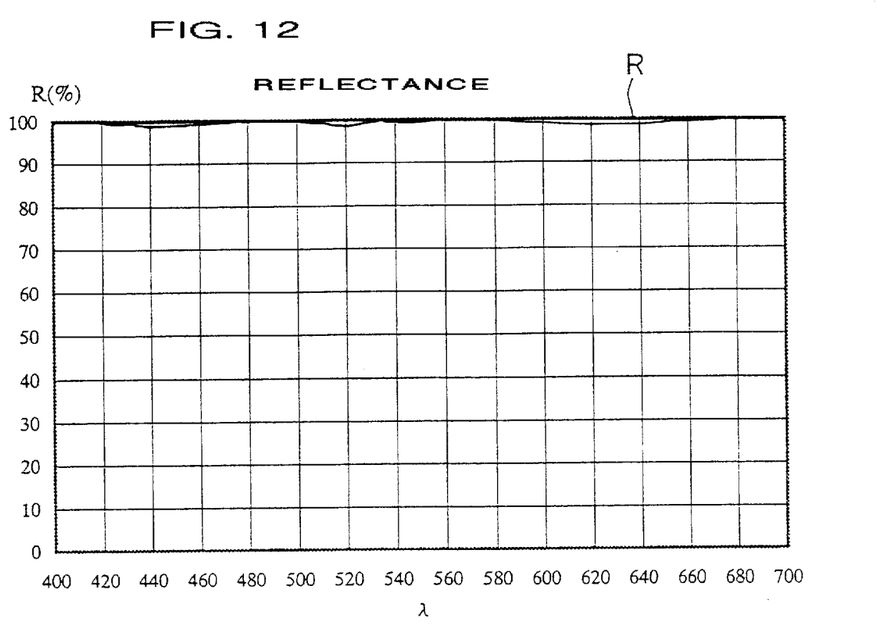
FIG. 12 is a graph which shows a reflectance R of each wavelength at an incident angle of 47.74° with respect to a pair of reflection surfaces, when a dielectric layer according to a third embodiment is provided on a reflection surface of a roof prism.
Figure 13:
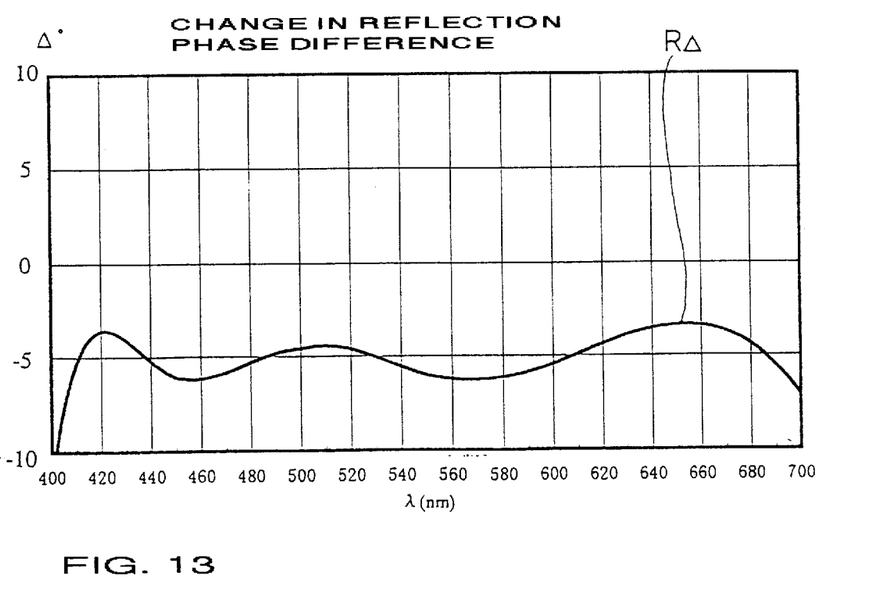
FIG. 13 is a graph which shows a change in phase difference RΔ at each wavelength, produced before and after light is reflected by each reflection surface when the incident angle is 47.74° with respect to a pair of reflection surfaces, in a third embodiment of the present invention.

FIG. 12 shows a reflectance R of each wavelength when light flux which is incident on the reflection surface of the roof-prism 13 through the objective lens 11 at an angle of incidence of −1° with respect to the optical axis of the lens 11 (at an incident angle of 47.74° on the roof prism) in the third embodiment. The reflectance of 100% is obtained in the entire wavelength range (400 to 700 nm) of the visible light. FIG. 13 shows the change in the phase differences for the same incident angle (47.74°) before and after the light is reflected by the reflection surfaces 13a and 13b. As made clear by the graph of FIG. 13, the amount of change in phase difference RΔ is reduced to be within approximately ±3°.

Figure 14:
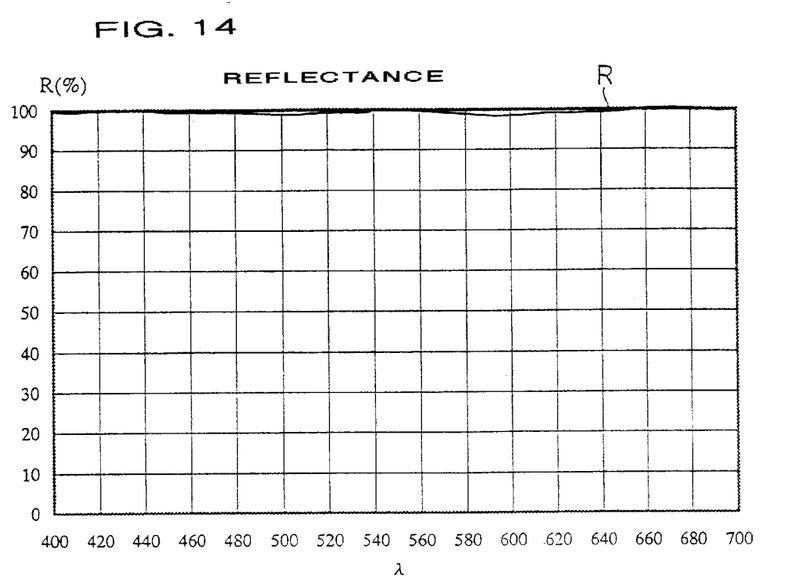
FIG. 14 is a graph which shows a reflectance R of each wavelength at an incident angle of 49.21° with respect to a pair of reflection surfaces, when a dielectric layer according to a third embodiment is provided on a reflection surface of a roof prism.
Figure 15:
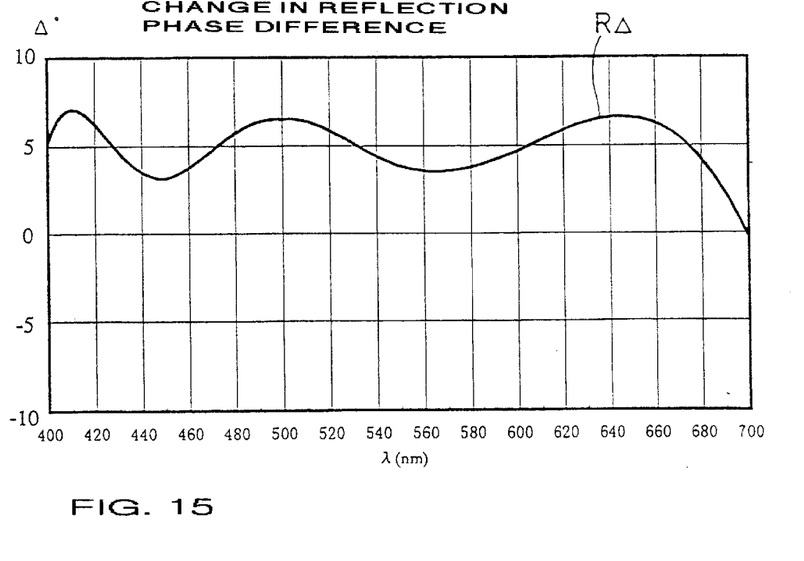
FIG. 15 is a graph which shows a change in phase difference RΔ at each wavelength, produced before and after light is reflected by each reflection surface when the incident angle is 49.21° with respect to a pair of reflection surfaces, in a third embodiment of the present invention; and, FIG. 16 is an explanatory view of a phase difference between a P-polarized light component and an S-polarized light component.

Likewise, FIG. 14 shows a reflectance R of each wavelength when the incident angle is 49.21° in the third embodiment. FIG. 15 shows the change in the phase differences between the wavelengths for the same incident angle (49.21°) before and after the light is reflected by the reflection surfaces 13a and 13b. As made clear by the graph of FIG. 15, the reflectance is 100% and the amount of change in phase difference RΔ is reduced to be within approximately ±8°.

In the above embodiments, the reflection surfaces 13a and 13b of the roof prism (Pechan prism) 13 are total reflection surfaces. However, the present invention can also be effective even if the reflection surfaces are not total reflection surfaces.

As can be understood from the above discussion, according to the present invention, in a viewing optical instrument using a roof prism, the wavefront aberrations caused by the phase difference can be restricted, thus resulting in no deterioration of an image to be viewed.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A viewing optical instrument having a roof prism which is provided with a pair of reflection surfaces intersecting at a nominal face angle of
   wherein a pupil is split by an edge line of said pair of reflection surfaces of the roof prism,
   wherein said reflection surfaces are provided with a multiple-layer coating having optical properties including that a change in the phase difference, before and after reflection, of light incident on each of said reflection surfaces is maintained within a predetermined value, and
   wherein said roof prism comprising a Pechan prism, whereby when the refractive index n of said Pechan prism is 1.46<n<1.60, said multiple-layer coating comprises first to ninth dielectric layers superimposed on the reflection surfaces of the Pechan prism in that order, said first to ninth layers having the following optical thicknesses d1 to d9 in nanometers and refractive indices M1, M2, M3, respectively, wherein 2.00<M1<2.10, 1.35<M2 1.40, 1.45<M3<1.50:
   1st layer: 34.0<d1<42.5 for index M1,
   2nd layer: 86.5<d2<102.0 for index M2,
   3rd layer: 58.0<d3<67.5 for index M1,
   4th layer: 152.0<d4<162.5 for index M3,
   5th layer: 64.0<d5<70.0 for index M1,
   6th layer: 100.0<d6<109.0 for index M3,
   7th layer: 130.9<d7<136.5 for index M1,
   8th layer: 223.0<d8<232.0 for index M2, and
   9th layer: 116.5<d9<121.5 for index M1.

2. A viewing optical instrument according to claim 1, wherein said roof prism satisfies the following relationship:

$$D \times \epsilon \leq 60$$

wherein
   D designates a cross-sectional diameter of light flux incident on the reflection surfaces, the cross section being taken perpendicular to the direction of incidence; and
   ε designates an error of the face angle of said pair of reflection surfaces with respect to the nominal angle of 90°.

3. A viewing optical instrument according to claim 1, wherein the precision of the nominal face angle of the roof prism is in the range of 90°±10".

4. A viewing optical instrument according to claim 1, wherein said multiple-layer coating comprises dielectric layers which do not absorb visible light.

5. The viewing optical instrument according to claim 1, further comprising at least one lens positioned in front of said roof prism, said optical properties comprising that the change in the phase difference of the P-polarized component and the S-polarized component produced before and after reflection by said light incident on each of the pair of the reflection surfaces of the roof prism, at an angle of incidence of ±1° with respect to the optical axis of the at least one lens, is within 90°.

6. The viewing optical instrument according to claim 1, said roof prism comprising a Pechan prism.

7. The roof prism according to claim 1, further comprising at least one lens positioned in front of said roof prism.

8. A viewing optical instrument having a roof prism which is provided with a pair of reflection surfaces intersecting at a nominal face angle of 90°,
   wherein a pupil is split by an edge line of said pair of reflection surfaces of the roof prism, and
   wherein said reflection surfaces are provided with a multiple-layer coating,
   said roof prism comprising a Pechan prism, whereby, when the refractive index n of said Pechan prism is 1.46<n<1.60, said multiple-layer coating comprises first to ninth dielectric layers superimposed on the reflection surfaces of the Pechan prism in that order, said first to ninth layers having the following optical thicknesses d1 to d9 in nanometers and refractive indices M1, M2, M3, respectively, wherein 2.00<M1<2.10, 1.35<M2<1.40, 1.45<M3<1.50:
   1st layer: 34.0<d1<42.5, for index M1
   2nd layer: 86.5<d2<102.0, for index M2
   3rd layer: 58.0<d3<67.5, for index M1
   4th layer: 152.0<d4<162.5, for index M3
   5th layer: 64.0<d5<70.0, for index M1
   6th layer: 100.0<d6<109.0, for index M3
   7th layer: 130.9<d7<136.5, for index M1
   8th layer: 223.0<d8<232.0, for index M2 and
   9th layer: 116.5<d9<121.5, for index M1.

9. The viewing optical instrument according to claim 8, said roof prism satisfying the following relationship:

$$D \times \epsilon \leq 60$$

wherein
   D represents a cross-sectional diameter of a light flux incident on the reflection surfaces, the cross section being taken perpendicular to the direction of incidence; and
   ε represents an error of the face angle of the pair of reflection surfaces with respect to the nominal angle of 90°.

10. The viewing optical instrument according to claim 8, wherein the precision of the nominal face angle of the roof prism is in the range of 90°≅10".

11. The viewing optical instrument according to claim 8, further comprising at least one lens positioned in front of said roof prism.

12. A roof prism comprising:

a pair of reflection surfaces intersecting at a nominal face angle of 90°, and said reflection surfaces being provided with a multiple-layer coating, wherein, when the refractive index n of the roof prism is 1.46<n<1.60, the multi-layer coating layers are composed of first to ninth dielectric layers superimposed on the reflection surfaces in that order, said first to ninth layers having the following optical thicknesses d1 to d9 in nanometers and refractive indices M1, M2, M3, respectively, wherein 2.00<M1<2.10, 1.35<M2<1.40, 1.45<M3<1.50:

1st layer: 34.0<d1<42.5, for index M1,
2nd layer: 86.5<d2<102.0, for index M2,
3rd layer: 58.0<d3<67.5, for index M1,
4th layer: 152.0<d4<162.5, for index M3,
5th layer: 64.0<d5<70.0, for index M1,
6th layer: 100.0<d6<109.0, for index M3,
7th layer: 130.9<d7<136.5, for index M1,
8th layer: 223.0<d8<232.0, for index M2, and
9th layer: 116.5<d9<121.5, for index M1.

13. The roof prism according to claim 12, said roof prism comprising a Pechan prism.

14. The roof prism according to claim 12, said roof prism satisfying the following relationship:

$$D \times \epsilon \leq 60$$

wherein

D represents a cross-sectional diameter of a light flux incident on the reflection surfaces, the cross section being taken perpendicular to the direction of incidence; and $\epsilon$ represents an error of the face angle of the pair of reflection surfaces with respect to the nominal angle of 90°.

15. The roof prism according to claim 12, wherein the precision of the nominal face angle of the roof prism is in the range of 90°±10".

16. A roof prism comprising:

a pair of reflection surfaces intersecting at a nominal face angle of 90°, wherein said reflection surfaces being provided with a multiple-layer coating, said multiple-layer coating having optical properties including that a change in the phase difference, before and after reflection, of light incident on each of said reflection surfaces is maintained within a predetermined value, wherein when the refractive index n of the roof prism is 1.46<n<1.60, the multi-layer coating layers are composed of first to ninth dielectric layers superimposed on the reflection surfaces in that order, said first to ninth layers having the following optical thicknesses d1 to d9 in nanometers and refractive indices M1, M2, M3, respectively, wherein 2.00<M1<2.10, 1.35<M2<1.40, 1.45<M3<1.50:

1st layer: 34.0<d1<42.5 for index M1,
2nd layer: 86.5<d2<102.0 for index M2,
3rd layer: 58.0<d3<67.5 for index M1,
4th layer: 152.0<d4<162.5 for index M3,
5th layer: 64.0<d5<70.0 for index M1,
6th layer: 100.0<d6<109.0 for index M3,
7th layer: 130.9<d7<136.5 for index M1,
8th layer: 223.0<d8<232.0 for index M2, and
9th layer: 116.5<d9<121.5 for index M1.

17. A roof prism according to claim 16, wherein said roof prism satisfies the following relationship:

$$D \times \epsilon \leq 60$$

wherein

D designates a cross-sectional diameter of light flux incident on the reflection surfaces, the cross section being taken perpendicular to the direction of incidence; and $\epsilon$ designates an error of the face angle of said pair of reflection surfaces with respect to the nominal angle of 90°.

18. A roof prism according to claim 16, wherein the precision of the nominal face angle of said pair of reflection surfaces is in the range of 90°±10".

19. A roof prism according to claim 16, wherein said multiple-layer coating comprises dielectric layers which do not absorb visible light.

20. A roof prism according to claim 16, said optical properties comprising that the change in the phase difference of the P-polarized component and the S-polarized component produced before and after reflection by light incident on each of the pair of the reflection surfaces of the roof prism, at an incident angle of 47.74 to 49.74°, is within 90°.

* * * * *